United States Patent [19]

Federici et al.

[11] Patent Number: 4,873,307

[45] Date of Patent: Oct. 10, 1989

[54] MONOCOMPONENT POLYURETHANE ADHESIVES

[76] Inventors: Franco Federici, 49, viale Stelvio, 21052 Busto Arsizio Varese; Franco Pallozzi, 18, via Duca degli Abruzzi, 20059 Vimercate, Milan; Ennio Cozzi, 2, via Novara, 20020 Cantalupo, Milan; Pietro Turco, 13, via Venezia, 21052 Busto Arsizio, Varese, all of Italy

[21] Appl. No.: 104,564

[22] Filed: Sep. 29, 1987

Related U.S. Application Data

[63] Continuation of Ser. No. 914,155, Oct. 1, 1986, abandoned.

[30] Foreign Application Priority Data

Oct. 2, 1985 [IT] Italy ................. 22336 A/85

[51] Int. Cl.$^4$ ............... C08G 18/10; C08G 18/32
[52] U.S. Cl. ......................... 528/60; 528/61; 528/62; 528/64; 525/453; 525/460; 525/504
[58] Field of Search ............... 528/60, 61, 62, 64; 525/453, 460, 504

[56] References Cited

U.S. PATENT DOCUMENTS

| | | | |
|---|---|---|---|
| 3,510,439 | 5/1970 | Kaltenbach et al. | 528/56 |
| 3,565,972 | 2/1971 | Harris | 528/48 |
| 3,637,903 | 1/1972 | Brizgys | 528/52 |
| 4,036,906 | 7/1977 | Finelli | 528/61 |
| 4,125,522 | 11/1978 | Becker | 528/61 |
| 4,127,542 | 11/1978 | Kaizerman et al. | 528/61 |
| 4,578,424 | 3/1986 | Goel | 528/73 |

*Primary Examiner*—John Kight
*Assistant Examiner*—Dennis R. Daley
*Attorney, Agent, or Firm*—Stevens, Davis, Miller & Mosher

[57] ABSTRACT

Monocomponent polyurethane adhesives comprising the reaction product of a polyurethane resin, having a content of free isocyanic groups comprised between 1.5 and 8, with a polyamine and an epoxy resin are disclosed.

The present invention relates to a monocomponent polyurethane adhesive.

More particularly, the present invention relates to a monocomponent polyurethane adhesive, particularly suitable for use in the field of laminated materials.

11 Claims, No Drawings

MONOCOMPONENT POLYURETHANE ADHESIVES

This application is a continuation of application Ser. No. 914,155, filed Oct. 1, 1986. now abandoned.

BACKGROUND OF THE INVENTION

As known, laminates consist of two or more plastic films of the same or of different type, coupled between them or stuck together by means of an adhesive. Said laminates, and in particular those intended for packaging foodstuffs, may incorporate a film covered on one side by a metal layer, such as aluminum or a thin sheet of aluminum or other metal to maintain the organoleptic properties (freshness, flavor, fragrance, etc.), of the packaged product, thus preserving it from air and moisture contact.

To stick the above-mentioned films an adhesive is generally necessary which, besides a long "pot-life", a good "green tack" and high cross-linking rate, shows a good resistance to heat and water. Furthermore, the adhesive must be non-reactive with the materials of which the films consist.

The adhesive used heretofore have generally a restricted application field in that they do not possess at the same time all of the requisite properties. Thus, for instance, the polyurethane adhesives based on polyether-polyols, have a good resistance to water but a poor tack, especially green tack, whereas polyurethane-polyester adhesives have an acceptable tack, but a poor resistance to water.

THE PRESENT INVENTION

We have now found that a non-reactive adhesive, satisfying all the requirements of the field of laminated materials and showing a long "pot-life", good "green tack", high cross-linking rate as well as good resistance to heat and water is that obtained by reacting a polyurethane resin having a content of free isocyanic groups comprised between 1.5 and 8, with a polyamine and with an epoxy resin wherein the ratio number of isocyanic groups of polyurethane resin/moles of polyamine is comprised between 0.8 and 1 and the ratio between the number of active hydrogen atoms of the polyamine and the number of epoxy groups of the epoxy resin is higher than 1, and preferably comprised between 1.2 and 2.5.

According to a preferred embodiment, the non-reactive adhesive of the present invention consists of the reaction product between one mole of polyurethane resin having a content of free NCO groups comprised between 1.5 and 4, and two moles of a polyamine and an epoxy resin wherein the ratio between the number of active hydrogens of the polyamine and the number of epoxy groups of the resin is comprised between 1.5 and 2.

The adhesive of the present invention can be used as such or, better, as a solution. Suitable solvents for the preparation of the solution may be an alcohol, such as methyl, ethyl, propyl alcohol, etc.; an ester, such as ethyl acetate, butyl acetate, ethyl-glycol acetate, etc.; a ketone, such as acetone, methyl-ethyl ketone, etc.; an ether, such as tetrahydrofuran, dioxane, etc. Ethyl alcohol is particularly preferred in that it shows certain advantages as to cheapness and environmental pollution. Furthermore, ethyl alcohol neither attacks nor is absorbed by the film even when the latter is printed or painted with vinylidene thermoplastic resins, polyvinyl-alcohol, etc. In the application in the field of laminted materials, ethyl alcohol is the preferred solvent because it evaporates easily so that the content of residual solvent in the laminated material is very low.

For the preparation of the monocomponent adhesive of the present invention the polyurethane resins obtained by reacting a polyisocyanate with a macroglycol can be used. Macroglycols having a molecular weight of about 200 to about 10,000, preferably of about 500 to about 2,000, can be used. Examples of macroglycols are polyalkylene glycols, saturated polyesters, polyethers, polyesters-urethanes, etc. Examples of macroglycols which may be used are: polyesters obtained by polycondensation of dicarboxylic acids or anhydrides, preferably aliphatic, containing from 4 to 9 carbon atoms, with aliphatic diols containing from 2 to 8 carbon atoms, alone or in mixtures thereof, polyesters obtained by polycondensation on diol "starters" of $\epsilon$-caprolactone; the polyaddition products of the above mentioned polyesters with organic diisocyanates in lower amount; polyethyleneglycol; polypropyleneglycols; the polymerization products of tetrahydrofuran, etc.

These macroglycols may be used alone or mixed with small quantities of a low molecular weight polyol, preferably a trifunctional polyol, such as trimethylolpropane, glycerol; 1,2,6-hexanetriol, etc.

The organic polyisocyanates useable can be either aromatic or aliphatic or cycloaliphatic; aromatic and cycloaliphatic polyisocyanates are preferred.

Examples of suitable polyisocyanates are: 2,4-toluenediisocyanate alone or mixed with the isomer 2,6-toluenediisocyahate; 4,4'-diphenyl-methanediisocyanate; ethylenediisocyanate, tetramethyl-diisocyanate, hexamethylene-diisocyanate, 1,2-dodecan-diisocyanate, cyclo-butane-1,3-diisocyanate, cyclohexane 1,3- and 1,4-diisocyanate, 4,4'- dicyclohexylmethane-diisocyanate; 1-isocyanate- 3-isocyanate-methyl-3,5,5-trimethyl-cyclohexane (or isoforon-diisocyanate); 2,2,4-trimethylhexanethylenediisocyanate mixed with the isomer 2,4,4-trimethylhexane-thylenediisocyanate, etc.

Any aliphatic, cycloaliphatic or heterocyclic polyamine containing from 2 to 6 amino groups can be used for the preparation of the monocomponent adhesive of the present invention. Some examples of polyamines which may be used are: ethylenediamine, diethylenetriamine, triethylenetetramine, propylenediamine, tetraethylene-pentamine, etc.

As epoxy resin any glycidyl derivative of polyphenols can be used.

Typical epoxy resins are those obtained by reacting epichlorohydrin with bisphenol A. The bisphenol A can be replaced by other phenols such as bisphenol F, novolacs, resorcinol, bis-(4-hydroxy-phenyl)-1,1-isobutane, amino-phenols, aromatic diamines, etc., and epichlorohydrin with other compounds acting as equivalent reactive sources of epoxy radicals.

Epoxy resins having an equivalent weight of epoxy oxygen comprised between 150 and 250, and preferably between 180 and 200, are preferred for the preparation of the present monocomponent adhesive.

For the preparation of the monocomponent polyurethane adhesives of the present invention, the following process is carried out.

The reaction between the polyurethane resin and the polyamine is carried out in organic solution at room temperature by adding the polyurethane resin to the polyamine. Suitable solvents may be methyl, ethyl, propyl alcohols, etc.

To the reaction product, consisting of the polyurethane resin containing the amine group function, the epoxy resin is added and the mixture is heated at a temperature comprised between 50° C. and the boiling point of the solvent, for a time comprised between 30 minutes and 10 hours.

The thus obtained adhesive can be used as such or at a higher concentration.

The following examples are given to better illustrate the present invention and are not intended to be limiting.

In the examples all the parts, percentages and ratios are by weight, unless otherwise indicated.

EXAMPLE 1

Into a 1,000 cc four-necked round-bottomed flask, equipped with stirrer, dropping funnel, thermometer and reflux cooler, there are introduced 124.0 g of 2,6-toluenediisocyanate.

The mixture is heated at 80° C. and 580 g of propylene glycol having a molecular weight equal to 1,010 are added dropwise, within 1.5 hours.

After heating at 100° C., the mixture is kept under stirring at this temperature for 12 hours.

150 g of ethyl acetate are added and the whole is then cooled to room temperature.

303.0 g of the obtained product are dissolved in 547.0 g of ethyl alcohol. The mixture is added within 20 minutes to a solution of 10.5 g of diethylenetriamine dissolved in 150.0 g of ethyl alcohol.

33.7 g of diglycylether of bisphenol A, having an eqiivalent weight of epoxy oxygen equal to 186, dissolved in g of ethyl alcohol are then added.

The whole is heated at 75° C. and kept at this temperature for 1 hour.

The product has a dry residue of 27.5% and a pot ford viscosity of 28 seconds, determined according to ASTM D 1200.

The solution of the thus obtained adhesive is applied to couple two films,one of which is a bistretched polypropylene film and the other a non-stretched propyleneethylene copolymer Tack values are reported in the table.

EXAMPLE 2

Using the same apparatus as that of Example 1, 157.0 g of 2,6-toluenediisocyanate are introduced and heated at 80° C. and within 1.5 hour a mixture is added consisting of 136.0 g of polypropyleneglycol (M.W.=426) and of 407.0 g of polypropyleneglycol (M.W.=1010).

The whole is heated at 100° C. and kept at this temperature for 7 hours.

150 g of ethylacetate are added and the mixture is cooled to room temperature.

303.6 g of the obtained product are dissolved in 546.4 g of ethyl alcohol and the mixture is added, within 20', to a solution of 16.0 g of diethylenetriamine, dissolved in 150.0 g of ethyl alcohol, at room temperature.

Thereafter, 57.5 g of diglycylether of bisphenol A having an equivalent weight of epoxy oxygen equal to 186, dissolved in 171.5 g of ethyl alcohol are added.

The whole is heated at 75° C. for 1 hour.

The dry residue of the product is 25.65%; the pot ford viscosity is 20 seconds.

The results are reported in the table.

EXAMPLE 3

Into a 5,000 cc round-bottomed flask, equipped with stirrer, thermometer, dropping funnel and reflux cooler, 531.2 g of 2,6-toluenediisocyanate are introduced; the product is heated at 80° C. and 2,469.0 g of polypropyleneglycol (M.W. 1,010) are added slowly, within 1.5 hours. The mixture is heated at ° C. and kept at this temperature for 2 hours.

639.3 g of ethylacetate are added and after cooling to 60° C., 3.0 g of dibutyltinlaurate are added as reaction catalyst.

The mixture is kept at this temperature for 1 hour.

After having cooled to room temperature, 1,456.0 g of the obtained product are dissolved in 2,500.0 g of ethylalcohol.

The mixture is added within 20' to a solution containing 43.3 g of diethylenetriamine dissolved in 845.0 g of ethylalcohol at room temperature.

153.5 g of diglycylether of bisphenol A, the equivalent weight of epoxy oxygen of which is 186, dissolved in 460.5 g of ethyl alcohol are added and the whole is heated at 75° C. for 1 hour.

The obtained product gives a dry residue equal to 25.6% and shows a pot ford 4 viscosity corresponding to 17 seconds.

The results are reported in the table.

We claim:

1. A monocomponent polyurethane adhesive having a long "pot life", good "green tack", a high cross-linking rate and good resistance to heat obtained by a process which comprises:

causing a polyurethane resin, having a content of free isocyanate groups of from about 1.5 to 8, and a polyamine selected from the class consisting of aliphatic, cycloaliphatic and heterocyclic polyamines having from 2 to 6 amino groups to react in an organic solvent, at room temperature, by adding the polyurethane resin to the polyamine and wherein the ratio between the number of isocyanate groups of the polyurethane resin and moles of polyamine is between 0.8 and 1;

adding an epoxy resin to the thus-obtained polyurethane resin containing amino groups, in order to have the number of active hydrogen atoms of polyamine/number of epoxy groups higher than 1; and heating the mixture at temperature from about 50° C. to about the boiling point of the solvent, for a time between 30 minutes and 10 hours.

2. A monocomponent polyurethane adhesive according to claim 1, wherein the ratio number of active hydrogen atoms of polyamine/number of epoxy groups of the epoxy resin is from 1.2 to 2.5.

3. A monocomponent polyurethane adhesive according to claim 1, wherein the ratio number of active hydrogen atoms of polyamine/number of epoxy groups of the epoxy resin is from 1.5 to 2.

4. A monocomponent polyurethane adhesive according to claim 1, wherein the polyurethane resin contains from 1.5 to 4 free NCO groups.

5. A monocomponent polyurethane adhesive according to claim 1, consisting of the reaction product of one mole of polyurethane resin, characterized in that the number of free NCO groups is from 1.5 to 4, with two moles of a polyamine and with an epoxy resin wherein the ratio between the number of active hydrogen atoms of the polyamine and the number of epoxy groups of the epoxy resin is from 1.5 to 2.

6. A monocomponent polyurethane adhesive according to claim 1, wherein the polyurethane resin is obtained by reacting a polyisocyanate with a macroglycol having a molecular weight of from about 200 to about 10,000.

7. A monocomponent polyurethane adhesive according to claim 1, wherein the polyurethane resin is obtained by reacting a polyisocyanate with a macroglycol having a molecular weight of from about 500 to about 2,000.

8. A monocomponent polyurethane adhesive according to claim 6, wherein the polyisocyanate is an aromatic or cycloaliphatic polyisocyanate.

9. A monocomponent polyurethane adhesive according to claim 1, wherein the epoxy resin has an equivalent weight per epoxy oxygen of from about 150 to about 250.

10. A monocomponent polyurethane adhesive according to claim 9, wherein the epoxy resin has an equivalent weight per epoxy oxygen of from about 180 to about 200.

11. A process for the preparation of a monocomponent polyurethane adhesive having a long "pot life", good "green tack", a high cross-linking rate and good resistance to heat obtained by a process which comrises:

causing a polyurethane resin, having a content of free isocyanate groups of from about 1.5 to 8, and a polyamine selected from the class consisting of aliphatic, cycloaliphatic and heterocyclic polyamines having from 2 to 6 amino groups to react in an organic solvent, at room temperature, by adding the polyurethane resin to the polyamine and wherein the ratio between the number of isocyanate groups of the polyurethane resin and moles of polyamine is between 0.8 and 1;

adding an epoxy resin to the thus-obtained polyurethane resin containing amino groups, in order to have the number of active hydrogen atoms of polyamine/number of epoxy groups higher than 1; and heating the mixture at temperature from about 50° C. to about the boiling point of the solvent, for a time between 30 minutes and 10 hours.

* * * * *